Oct. 21, 1941.  M. C. OVERMAN  2,260,193
NONSKID TIRE
Filed Sept. 17, 1938
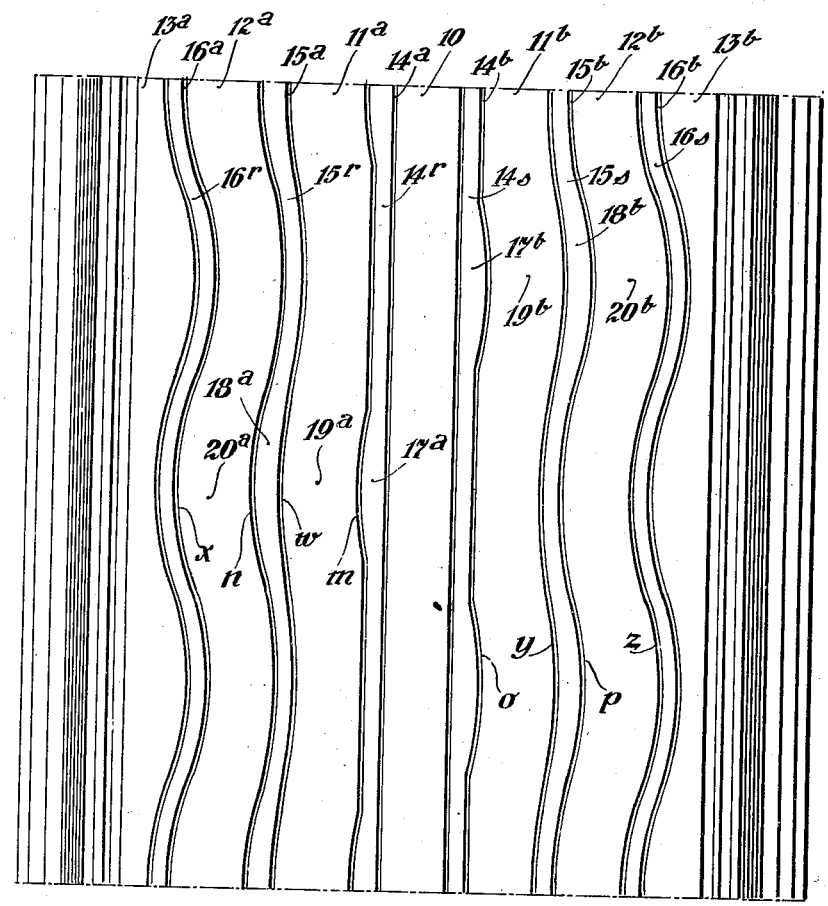
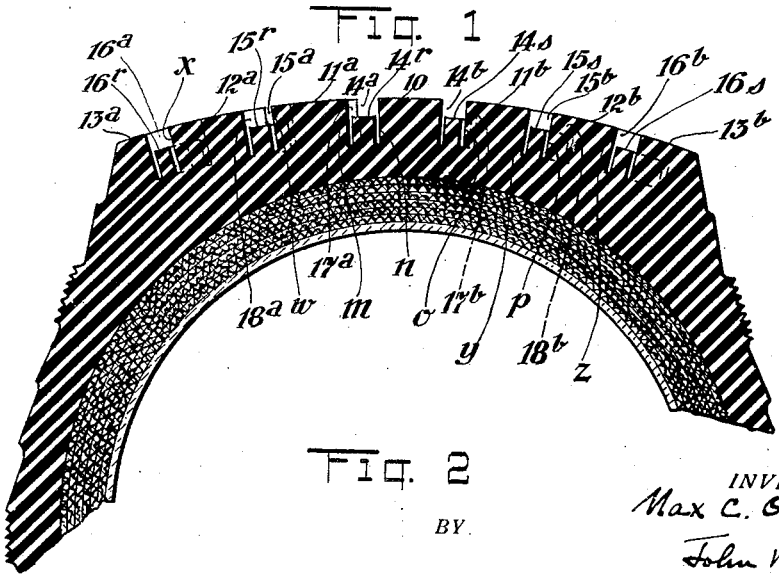
INVENTOR
Max C. Overman
BY
John W. Hoag.
ATTORNEY Patented Oct. 21, 1941

2,260,193

UNITED STATES PATENT OFFICE 2,260,193

NONSKID TIRE

Max C. Overman, New York, N. Y., assignor, by mesne assignments, to M. C. O. Corporation, New York, N. Y., a corporation of Delaware Application September 17, 1938, Serial No. 230,355

8 Claims. (Cl. 152—209)

This invention relates to tires and aims to provide an improved non-skid tire.

In my co-pending application Serial No. 221,060, filed July 25, 1938, I have shown and described several modifications of a tire tread comprising generally circumferential load bearing ribs including straight and more or less serpentine circumferentially extending ribs. As shown in Figure 4 of that application short non-continuous load supporting tread areas are provided at intervals between adjoining straight and serpentine continuous load supporting ribs in order to compensate for the difference in contour between the straight ribs and the serpentine ribs.

I have found that certain disadvantages arise from combining tread surfaces of different sizes and area. In general, other factors being equal, larger masses of tread surface will wear more rapidly than smaller masses due to the fact that they are less flexible and therefore subject to greater friction. On the other hand small masses tend to develop "heel and toe" wear, i. e., the front and rear edges of the mass become worn more rapidly than the middle or central portion.

My present invention relates to an improved tread structure combining continuous straight and serpentine load supporting ribs in such a way as to eliminate the short non-continuous load supporting tread areas, and to minimize differences in mass of the load supporting areas, particularly in the central portion of the tread which is subjected to the greatest wear. In carrying out my invention I provide a tread surface comprising one or more circumferential straight load supporting ribs and a number of circumferentially extending serpentine load supporting ribs, and compensate for the difference in contour between the straight and serpentine ribs by increasing the width of portions of the load bearing ribs or of the spaces or grooves between the load bearing ribs, or both, preferably progressively in both directions from the median line of the tire. Extending upwardly from the bottom of the respective grooves I provide other ribs narrower than the load supporting ribs and each narrower than the groove in which it is formed but corresponding to it in contour. These narrower ribs serve to reinforce the load bearing ribs when the latter are distorted, but are ordinarily substantially non-load supporting, and may be made somewhat lower than the load supporting ribs.

My improved tread structure has many important advantages of utility and safety. It combines in one tire high anti-skid and traction qualities, and even wear. By progressively varying the contour of the serpentine load bearing ribs the safety qualities of the tire are increased in proportion to the distortion of the tread, the ribs with the greatest curvature being functionally employed when the need for them is greatest.

It will be understood that the modification of the invention as described herein is presented by way of explanation and not of limitation, and that the number, size, and curvature of the load bearing ribs, intermediate grooves, and the reinforcing ribs, may be substantially varied according to the purpose for which the tire is designed, without departing from the scope of the invention.

My invention will best be understood if the following description is read in connection with the drawing, in which:

Figure 1 is a top plan view of a portion of the tread surface; and

Figure 2 is a transverse sectional view of the tread portion of a tire.

In the modification of the invention illustrated in the drawing a straight load supporting rib 10 is shown extending around the median or central portion of the tire. On either side of the straight rib 10 and adjacent thereto are the serpentine ribs 11a and 11b respectively, and beyond the ribs 11a and 11b are the ribs 12a and 12b of somewhat greater curvature than ribs 11a and 11b. Beyond the ribs 12a and 12b are ribs 13a and 13b which extend into the side walls of the tire and normally are called upon to support very little of the load.

Between load supporting rib 10 and load supporting ribs 11a and 11b respectively are the grooves 14a and 14b; between the load supporting ribs 11a and 11b and 12a and 12b respectively are the grooves 15a and 15b; and between the ribs 12a and 12b and 13a and 13b respectively are the grooves 16a and 16b. In the respective grooves reinforcing ribs 14r and 14s, 15r and 15s, and 16r and 16s, are provided. They are narrower than ribs 10, 11a, 11b, 12a and 12b and are normally non-load supporting. They serve to reinforce the load supporting ribs when the latter are distorted. Each of the reinforcing ribs is spaced somewhat from the side walls of the adjoining load supporting ribs when the latter are not distorted, and follows the contour of the groove in which it is located. The reinforcing ribs may be made shorter than the load supporting ribs. As illustrated herein the reinforcing ribs are only a little more than half the height of the load supporting ribs but their relative height may be varied depending on the width of the load supporting ribs and of the reinforcing ribs and the use for which the tire is intended.

Preferably both the load supporting ribs and the reinforcing ribs are formed with non-draft side walls, i. e. side walls which are normal to the tread surface.

It will be seen that grooves 14a and 14b, and 15a and 15b, have portions, 17a and 17b, and 18a and 18b, respectively, of increased width in alinement with the outwardly curving portions 19a and 20a, and 19b and 20b, of the load supporting ribs on their respective sides of the median rib 10. It will also be seen that portions of the outer side walls w, x, y and z respectively of supporting ribs 11a and 11b and 12a and 12b, are curved to a somewhat greater degree than the inner walls m, n, o, p, and similarly that the inner walls n and p, of supporting ribs 12a and 12b, are curved to a somewhat greater degree than the outer walls w and y, of ribs 11a and 11b. The result of thus progressively increasing the curvature of the side walls of the load supporting ribs is to take up gradually the spaces which would otherwise be created in proportion to the extent to which the most serpentine ribs, 12a and 12b, deviate from a straight line. In this way non-continuous load supporting tread areas are eliminated and the masses of the supporting ribs are made to approach equality.

The ribs 12a and 12b, being the most serpentine are therefore of high tractive qualities. Most of the load will ordinarily be supported by straight rib 10 and moderately curved serpentine ribs 11a and 11b, but in sand or mud, or upon sudden distortion of the tread as under severe deceleration or acceleration, the ribs 12a and 12b will come into full play. The improved structure disclosed herein is adapted to give a high degree of traction without the digging which is characteristic of transverse cleats, and which in soft ground tends to dig holes under the tires.

The depth of the grooves or spaces between the load supporting ribs may be varied widely depending on the type, intended use and characteristics desired of the tire. While the invention is not limited to any dimensions, grooves of a depth of from three-eighths to one half an inch are preferred for average passenger car tires. For special uses, for example in tractor tires, it may be desirable to materially increase the depth of the grooves.

What I claim is:

1. A non-skid tire having a tread portion comprising a straight load bearing rib extending circumferentially around the median line of the tire and serpentine ribs of differing curvature arranged on either side of said straight rib in a manner such that the degree of curvature of said serpentine ribs increases progressively in proportion to the distance from the straight median rib.

2. A non-skid tire having a tread portion comprising a straight load bearing rib extending circumferentially around the median line of the tire and serpentine ribs of differing curvature arranged at spaced intervals on either side of said straight rib in a manner such that the degree of curvature of said serpentine ribs increases progressively in proportion to the distance from the straight median rib, and circumferentially extending non-load bearing serpentine ribs of non-uniform width extending outwardly from the bottom of the spaces between said load bearing ribs, the curvature of said non-load bearing ribs also increasing progressively in proportion to the distance from the straight median rib.

3. A non-skid tire having a tread comprising two groups of serpentine load bearing ribs of differing curvature arranged so that the ribs with the greatest degree of curvature are spaced furthest from the median line of the tire to give increased traction under increased loads.

4. A non-skid tire having a tread comprising a number of spaced serpentine load bearing ribs of differing curvature having sides normal to the tread surface and distortable under lateral stress arranged so that the ribs with the lesser curvature are positioned in the portion of the tread normally in contact with a hard road surface whereas the ribs with the greater curvature are positioned between the aforesaid ribs and the side walls of the tire.

5. A non-skid tire having a straight load bearing rib extending circumferentially around the median line of the tread, and serpentine load bearing ribs, increasing respectively in curvature progressively in proportion to their distance from said straight rib, spaced from one another by spaces having portions of increased width proportional to the undulations of said serpentine ribs.

6. A non-skid tire having a straight load bearing rib extending around the median line of the tire, serpentine load bearing ribs disposed on either side of said straight load bearing rib, and narrow, serpentine, substantially non-load bearing ribs disposed alternately with said load bearing ribs in the spaces between said load bearing ribs but spaced from the side walls of said load bearing ribs by spaces narrower than the width of said substantially non-load bearing ribs said serpentine load bearing ribs being of different curvatures, each successive rib, from the median rib or ribs outwardly, becoming more undulant than the next adjoining rib between it and the median rib or ribs, said non-load bearing ribs having portions of increased width proportional to the difference in the curvature of the adjacent sides of adjoining load bearing ribs.

7. A non-skid tire having a tread portion comprising a high, straight, load bearing rib, extending circumferentially around the median line of the tire, serpentine load bearing ribs disposed on either side of said straight central rib, each of said load bearing ribs having parallel sides and being of greater width then height, and narrower substantially non-load bearing ribs, disposed alternately with said load bearing ribs, said substantially non-load bearing ribs being of greater height than width, and spaced on both sides from said load bearing ribs.

8. A non-skid tire comprising alternately a number of circumferentially extending load bearing ribs, and narrow, substantially non-load bearing ribs of greater height than width, all of said load bearing and substantially non-load bearing ribs having substantially parallel side walls, the non-load bearing ribs being spaced from the load bearing ribs by spaces which are only a fraction of the width of the substantially non-load bearing ribs, at least one of said load bearing ribs being a straight rib extending circumferentially around the median line of the tire, and said other load bearing ribs being serpentine and disposed on either side of said straight central rib the serpentine ribs on each side of said median rib or ribs being of different curvature, each successive rib from the median rib outwardly being more undulant than the adjacent rib between it and said median rib or ribs, each serpentine rib having portions of increased width proportional to the difference in curvature of adjoining serpentine ribs.

MAX C. OVERMAN.